United States Patent [19]

Culley

[11] 4,393,490
[45] Jul. 12, 1983

[54] DIGITAL TELECOMMUNICATIONS SWITCHES NETWORK WITH IN-BUILT FAULT IDENTIFICATION

[75] Inventor: Ernest Culley, Broadstone, England

[73] Assignees: The Plessey Company plc, Ilford, England; The Plessey Company plc, Ilford, England

[21] Appl. No.: 176,136

[22] Filed: Aug. 7, 1980

[30] Foreign Application Priority Data

Aug. 10, 1979 [GB] United Kingdom ................. 7927857

[51] Int. Cl.³ ........................ H04J 3/14; H04Q 11/04
[52] U.S. Cl. ......................................... 370/13; 370/63
[58] Field of Search ...................... 370/13, 14, 54, 58, 370/63, 59

[56] References Cited

U.S. PATENT DOCUMENTS

| 3,937,935 | 2/1976 | Le Pabic | 370/13 |
| 4,163,122 | 7/1979 | de Goede | 370/13 |
| 4,300,230 | 11/1981 | Philip et al. | 370/13 |

FOREIGN PATENT DOCUMENTS 1393645  5/1975  United Kingdom.
1439568  6/1976  United Kingdom.

Primary Examiner—Douglas W. Olms
Attorney, Agent, or Firm—Fleit, Jacobson & Cohn; Fleit, Jacobson & Cohn

[57] ABSTRACT

In modern digital telecommunications switching networks the switch block may be a duplicated plane time-space-time arrangement in which each time switch stage and each space switch stage is controlled by control stores. Each control store is cross-office slot ordered and is arranged to be loaded by the central control with the identity of the connection required for the relevant cross-office slot. At each busy cross-office slot in a time switch control store a 12 bit address word is retrieved. Ten bits are used to define the connection while the two remaining bits act as a busy bit and a parity bit. Each space switch control store contains in cross-office slot order eight bit address words (6 bits address plus busy and parity bits). The busy bits are used when interrogating the trunking for free paths and they are also used to control the application of idle codes to free slots in the speech path. The parity bits within the control stores are used to initiate pattern insertion on the speech highways. The detection of "bad parity" causes characteristic patterns to replace an erroneously accessed samples at the time or space switch and the replaced sample will be intercepted at the transmit digital line termination unit, which will be biased to choose the sample from the other plane of the switch block. The inserted pattern also identifies the trunking element to which the erroneous address has been applied so that the DLT is able to indicate the faulty control store.

3 Claims, 5 Drawing Figures

DIGITAL TELECOMMUNICATIONS SWITCHES NETWORK WITH IN-BUILT FAULT IDENTIFICATION

The present invention relates to telecommunications exchange switching networks for use in handling digital traffic such as that produced by time division multiplex pulse code modulation transmission systems.

The so-called digital switching networks provided in such exchanges consist of combinations of time and space switching elements. The time switches are used to switch the order of the time division multiplex channels whereas the space switches are used to switch specific channels between time division multiplexes.

Typically a digital exchange uses random access storage to provide the time switching function and integrated-circuit multiplexors to provide the space switching function. Exchange configurations vary but basically fall into two categories which can be defined as time-space-time or space-time-space networks. Each time switch contains the speech stores, control memories and associated logic to allow the contents of one of its input time slots to be transferred to any output time slot. Each space switch is an array of selector devices allowing spatial connection of two different links or highways within the network trunking. Acting in time division multiplex mode the crosspoint configuration changes at the rate of appearance of the time slots. Accordingly the various paths of the exchange network are used for different connections at different times throughout a t.d.m. frame. Such an arrangement creates severe difficulties for fault detection and fault finding arrangements.

It is an aim of the present invention to incorporate into a digital exchange switching network fault identification equipment which will ease the problems of fault location.

According to the invention there is provided a telecommunications exchange switching network including time and space switching stages in which each time and space switching stage includes connection control stores arranged to be read in cross-office slot order to provide the speech path connection information for each cross-office slot and each control store includes means for checking the authenticity of the connection specified by the control store at each cross-office slot and in the event of an error being detected injection means are provided to inject into the speech path of the defined connection a characteristic pattern which is detected as a corrupted speech sample.

In one embodiment of the invention the switching network is a duplicated plane time-space-time arrangement in which each time switch stage and each space switch stage is controlled by control stores. Each control store is cross-office slot ordered and is arranged to be loaded by the central control with the identity of the connection required for the relevant cross-office slot. At each busy cross-office slot in a time switch control store a 12 bit address word is retrieved. Ten bits are used to define the connection while the two remaining bits act as a busy bit and a parity bit. Each space switch control store contains in cross-office slot order eight bit address words (6 address bits plus busy and parity bits). The busy bits are used when interrogating the trunking for free paths and they are also used to control the application of idle codes to free slots in the speech paths. The parity bits within the control stores are used to initiate pattern insertion on the speech highways. The detection of "bad parity" causes characteristic patterns to replace erroneously accessed samples at the time or space switch and the replaced sample will be intercepted at the transmit digital line termination (DLT) unit which will be biased to choose the sample from the other plane of the switch block. The inserted pattern also identifies the trunking element to which the erroneous address has been applied so that the DLT is able to indicate the faulty control store.

The following description of one embodiment of the invention will be used to describe the invention together with its various features. The description should be read in conjunction with the accompanying drawings. Of the drawings.

In modern telecommunications switching exchanges it is customary to provide a number of sub-systems which are integrated together using stored program control to provide the overall exchange system. The particular sub-system to which the invention relates is a so-called "digital switching sub-system" or (DSS). Typical of such a system arrangement is disclosed in outline on page 221 of Vol. 71 part 4 (January 1979) in the Post Office Electrical Engineers Journal in an article entitled "System X" by J. Martin.

Figure 1:
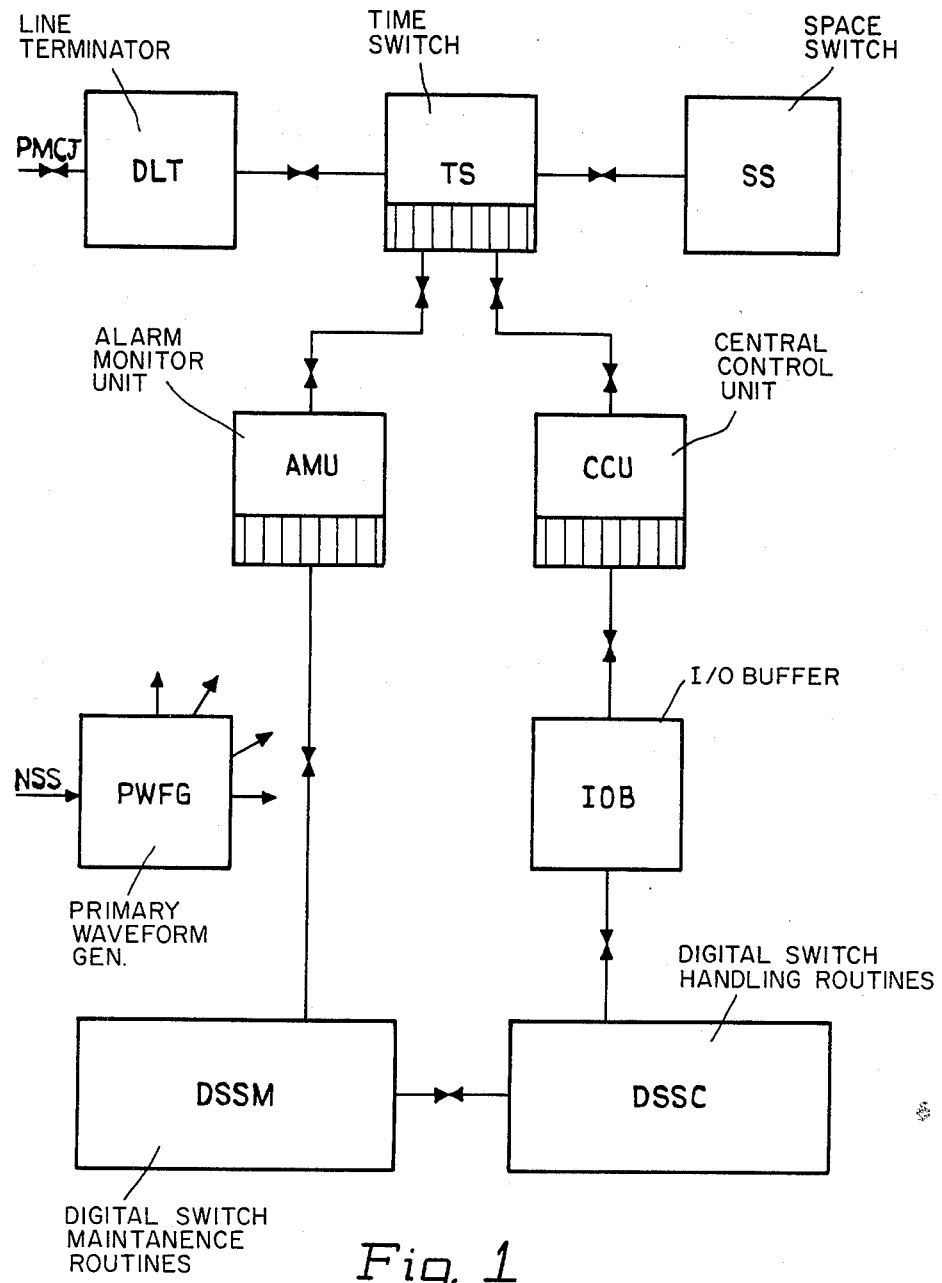
FIG. 1 shows a block diagram of a telecommunications digital switching sub-system suitable for incorporation of one embodiment of the invention.

The main function of a digital switching sub-system (DSS) in a System X exchange is to switch p.c.m. encoded duplex speech paths between any two routes connected to the exchange. The speech paths are terminated on the DSS as time slots on a standard 2.048 Mbits/second 30 channel pulse-code modulated system. A basic block diagram of the DSS is shown in FIG. 1.

The range of functional entities from which the DSS is constructed are listed below with a simplified description of each.

The Digital Line Termination Unit (DLT) provides the interface between the four-wire, 32 timeslot, 2048 kb/s multiplexes PCMJ and the switchblock consisting of the time switch TS and the space switch SS. As described later the DLT plays a wide range of roles, some associated with the line systems, some with the security, fault finding and diagnosis of the trunking.

The Time Switch (TS) contains the speech stores, control memories and associated hardware and firmware logic enabling the contents of one of its input timeslots to be transferred to any output timeslot.

The Space Switch (SS) is the array of selector devices enabling spatial connection of two different links or highways within the trunking. Acting in time-division mode the crosspoint configuration can change at the rate of appearance of the timeslots. Each crosspoint is nine bits in parallel, eight speech bits plus a parity bit.

The Central Control Unit (CCU) is a combination of hardware and firmware, interacting with the trunking to perform such functions as interrogation for free paths and establishment of such paths once they are found. It relieves the main processing system of load which is especially important in large exchanges where high demands are made on that main processing system by the many subsystems which it serves.

The Alarm Monitor Unit (AMU) in a similar manner to the CCU, is a combination of hardware and firmware included to relieve main processing of load, —in this instance by preprocessing alarm data. It is a more active device than its name implies, initiating maintenance related commands in addition to monitoring, persistence checking and "filtering" alarm outputs. It is an important part of the maintenance pathway from switch to main processor, independent of the CCU route, which in large exchanges can be fully occupied with control information.

The Primary Waveform Generator (PWFG) is the timebase or clock on which all the digital logic of the DSS is dependent. It supplies 8 KHz frame start signals and 2048 KHz, bit streams, the latter of which may be multiplied by phase locked loop and voltage control oscillators at appropriate points in the switch where higher frequencies are required for direct application to logic devices or for division back to 2048 KHz signals of high tolerance mark-space ratio. In main network switching centres the PWFG frequency is influenced by the Timing Unit of a National Synchronisation Utility over lead NSS.

The Input Output Buffer (IOB) is the hardware control interface with the exchange control multiprocessor system. It provides storage for the queueing of messages from control software to CCU and vice versa.

The Switch Handler Software (DSS CS) is the DSS applications process which receives control tasks from DSS user-subsystems such as the Call Processing Subsystem. The handler validates commands, checking that the user subsystem has a right of access to the switch terminations it is addressing. It instructs the DSS hardware to perform such operations as connection set-up using Network Termination Identities supplied by the requesting subsystem and responds to that subsystem with a confirmation (or otherwise) of the successful execution of the operation. There is a degree of implementation dependence in DSS software functions related to the break point in exchange size, multiprocessor or dual processor control. There is also much commonality.

The Maintenance Software (DSS MS) is the DSS applications process(es) concerned with fault handling at various levels of detection, routining and diagnostics. It interacts with the handler software and with the Maintenance Control System.

Figure 2:
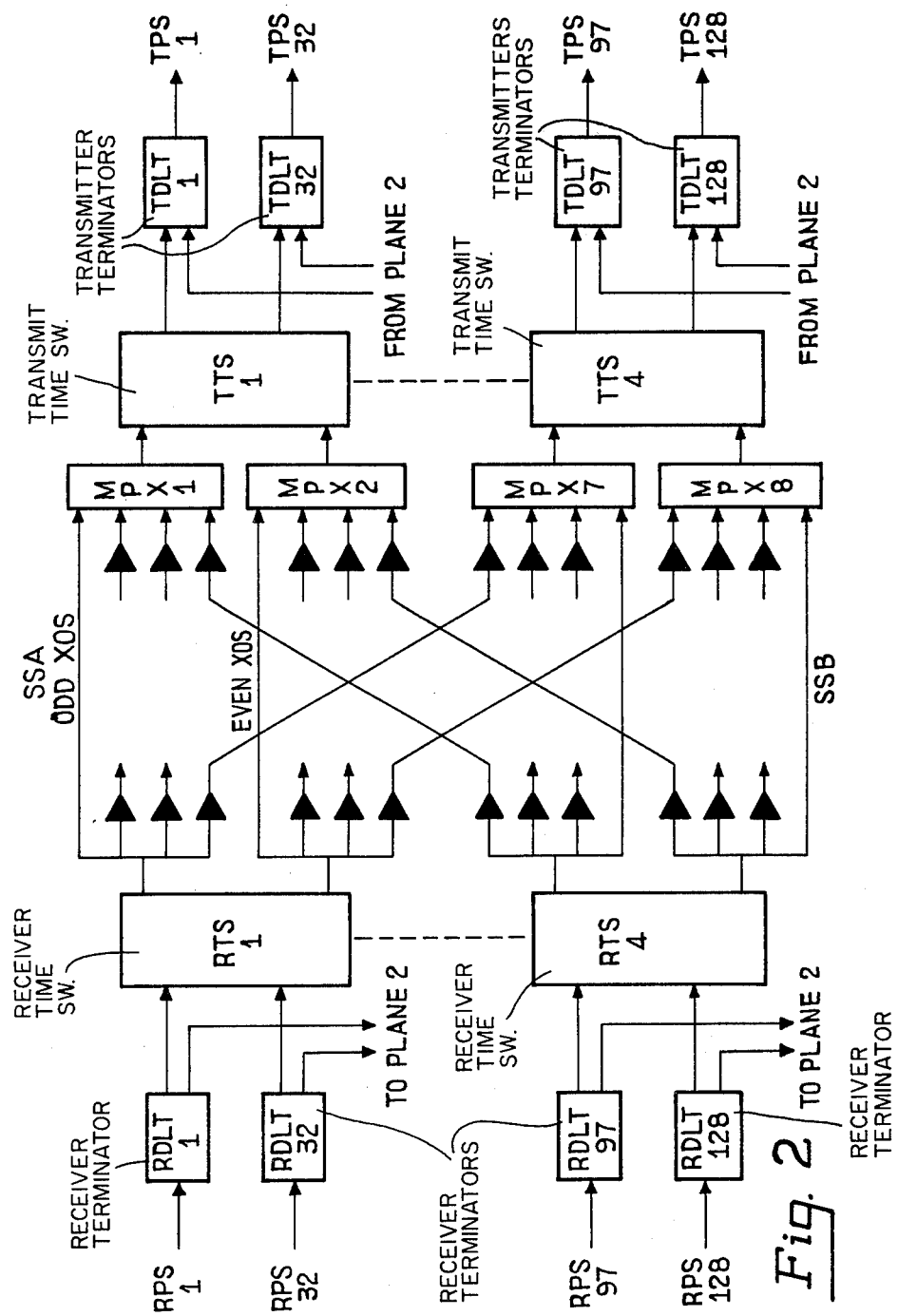
FIG. 2 shows a block diagram of the switching equipment used in the digital switching sub-system.

Referring now to FIG. 2 more detailed consideration will be given to the equipment used in the switchblock which is made up of receive digital line termination units RDLT 1-128, receive time switches RTS 1-4, space switches SSA and SSB, transmit time switches TTS 1-4 and transmit digital line termination units TDLT 1-128 to provide a switchblock with a speech traffic switching capability of 1,000 through erlangs approximately. The time and space switching functions are duplicated and only one plane is shown in FIG. 2 but the leads referenced TP2 indicate the access points to the second plane (i.e. plane 2).

Digital line termination units

The incoming p.c.m. line systems RPS 1-128 are each terminated upon an individual receive digital line termination units RDLT 1 to 128. Each receive digital line termination unit provides (i) the interface to the incoming PCM line system (ii) error detection and alarm indications both internal for the DSS and external for the transmission line systems for passage to the alarm monitor unit AMU, (iii) pattern insertion for path checking and loop-back facilities for fault location and diagnostics and (iv) frame alignment using an elastic buffer store to align incoming information to the exchange clock.

The outgoing p.c.m. line systems TPS 1-128 are fed from the transmit digital line termination units TDLT 1 to 128. Each transmit digital line termination unit provides (i) the interface to the outgoing PCM line system, (ii) signalling injection arrangements for the outgoing line systems and (iii) accepts the two samples from the duplicated planes, compares the samples and selects for transmission the sample having good parity. The outgoing digital line transmission units also include arrangements allowing the unit to be biased to select one of the planes to the exclusion of the other to supply the speech samples for transmission.

Time Switch

There are three planes of timing through the trunking and these are:

(i) time of reception of the sample from the incoming line, (ii) time allocated by the control for transfer of the sample across the exchange and (iii) time of transmission of the sample to the outgoing line.

Figure 3:
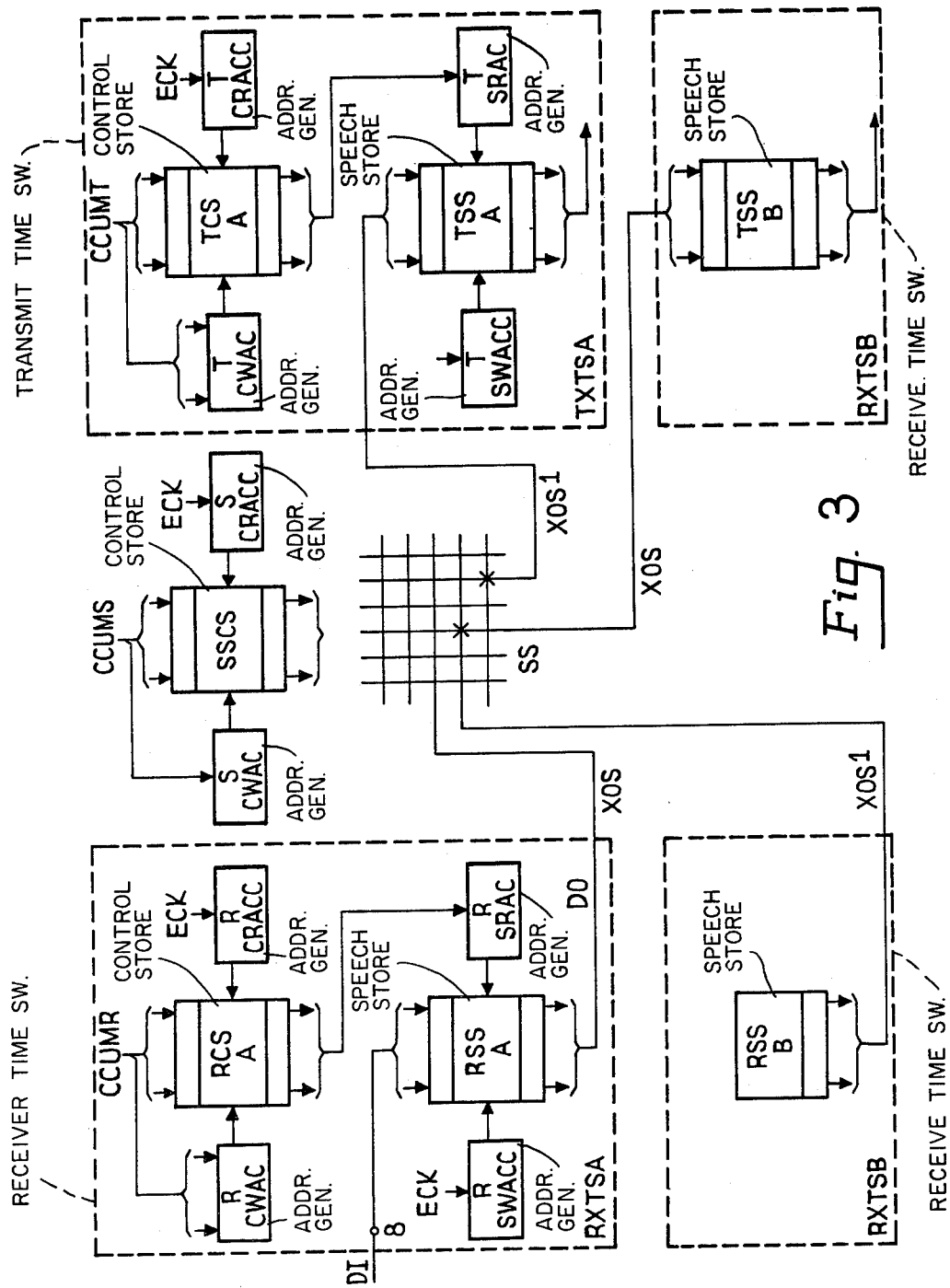
FIG. 3 shows a block diagram of the equipment used in the time switches and the space switch.

The receive and transmit speech stores are used to provide the required buffering between these events. The time switch control store organisation is shown in simplified form in FIG. 3.

A receive time switch, such as RXTSA, consists of a receive speech store RSSA and a control store RCSA. Each store has 1024 locations and each is provided with read and write address counters.

The receive speech store RSSA is written to cyclically under the control of the receive speech write address cyclic counter RSWACC which is driven by the exchange clock ECK. This causes the 1024 p.c.m. channels from the 32 multiplexes served by the receive digital line termination units presented to on leads DI to be written in to the speech store RSSA as 8 bit samples plus a parity bit in channel and multiplier order. That is in strict order of arrival time, channel 0, system 0 in speech store location 0 etc. The speech store RSSA reading operation is controlled by the information produced by the control store for that receive time switch. Accordingly for receive time switch RXTSA the control store RCSA is cyclically addressed, by CRACC, for read operations at internal timeslot, or cross-office slot (XOS) time which is in synchronism with the addressing for write operations of the receive speech store RSSA under the control of the exchange clock ECK. The control store RCSA contains 1024 store locations each holding the address of the receive speech store RSSA to be read in the corresponding cross-office slot (XOS). The time of reading of the speech store RSSA depends upon the internal timeslot chosen by the control, which controls the action by loading into the corresponding control store RCSA location, the address of the receive speech store RSSA location used to receive the required incoming p.c.m. channel. Accordingly at each cross-office slot time the control store RCSA is read in sequence and the stored samples are read out into the space switch SS. The address information held in each location in the control store RCSA consists of twelve bits, five of which define one out of 32 p.c.m. line systems served by the receive speech store RSSA and five of which define one out of 32 channels in an incoming p.c.m. system, together with a busy bit (indicating that the cross-office time slot is in use) and a parity bit relative to the rest of the data word.

Figure 4:
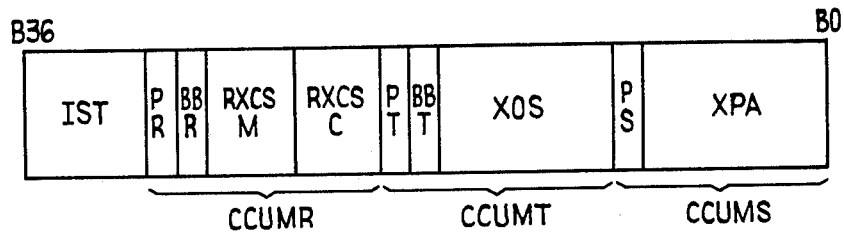
FIG. 4 shows the format of a common control unit message.

As mentioned above the cross-office data stream read out of the receive speech store RSSA under the control of the control store RSSA is distributed to the relevant transmit time switches by the space switch SS. The space switch similarly includes a control store, such as SSCS in FIG. 3, which circulates under the control of the exchange clock ECK at the cross-office time slot rate. The space switch control store SSCS contains a 7 bit address and parity bit to enable addressing of up to 96 crosspoints in the column it controls. For simplicity of interfacing to the exchange control the control stores are provided in the time switches. Control information is passed to the space switch in the form of a column address in parallel with the speech data, between the time switch and the space switch. The control message is shown in FIG. 4 and will be considered in greater detail later after considering the transmit time switch operation.

A transmit time switch, such as TXTSA, consists of a transmit speech store TSSA and a control store TCSA. Each store has 1024 locations and each is provided with read and write address counters.

The transmit speech store TSSA is written to cyclically under the control of the exchange clock ECK driven cyclic write address counter SWACC to store the speech samples issuing from the corresponding column of the space switch cyclically into its location. The transmit speech store TSSA holds the speech samples from the time of reception from the space switch highway until the time of transmission on the required transmit p.c.m. line system. The acyclic read operation is controlled by the transmit control store TCSA using the read address counter TSRAC. The transmit control store TCSA cycles at the outgoing p.c.m. line system channel rate under the control of the exchange clock EKC driven read counter TCRACC. The control store locations are numbered sequentially in order of p.c.m. channel and system and the time of reading of the speech store TSSA depends upon the address of the required TSSA location being read from TCSA at the required p.c.m. channel and system time. The address read from each location of TCSA consists of 12 bits with 10 defining the TSSA location together with a busy bit and a parity bit.

In operation then the switchblock receives in receive p.c.m. channel order a sample to be switched and stores it until the identity of that channel is defined by the cross-office slot read from the receive control store. The sample is then fed to the space switch which at that time is conditioned by the space switch control store to feed the sample to the transmit speech store location which serves the channel and transmit p.c.m. line system selected to handle the speech sample. The control stores are set up to handle the required connection using the control message shown in FIG. 5. This message is interpreted by a microprocessor which controls the reading and writing of addresses into the control stores and checks that the data is written correctly. The message includes an instruction section IST, a receive control store message CCUMR, a transmit control store message CCUMT and a space switch control store message CCUMS. The receive control store message CCUMR consists of a receive multiplex address RXCSM and a receive channel address RXCSC together with a busy bit BBR and a parity bit PR. The transmit control store message CCUMT consists of a cross-office slot address XOS together with a busy bit BBT and a parity bit PT whereas the space switch control store message CCUMS consists of a crosspoint address and a parity bit. The information is written into the relevant control stores at the address selected by the write address counters RLWAC, TCWAC and SWAC respectively which is under the control of information generated by the micro-processors serving the control stores.

The control store busy bits are used by the exchange control when interrogating the trunking for free paths. As well as providing speech store addresses the control stores also control the application of idle codes. These are injected into free time slots in the speech path and are used for the guidance of plane selection and error detection in the transmit digital line termination units TDLT 1 to 128 in FIG. 2. They are also passed on by the transmit DLT's into the free outgoing p.c.m. channels for line transmission reasons. In addition the control stores contain parity bits and these are used to corrupt the speech path and in turn to violate its parity. This causes the transmit DLT to detect a control store fault immediately and to trigger the fault location process, thus enabling the transmit DLT to select speech samples from the good plane until full reconfiguration takes place.

Figure 5:
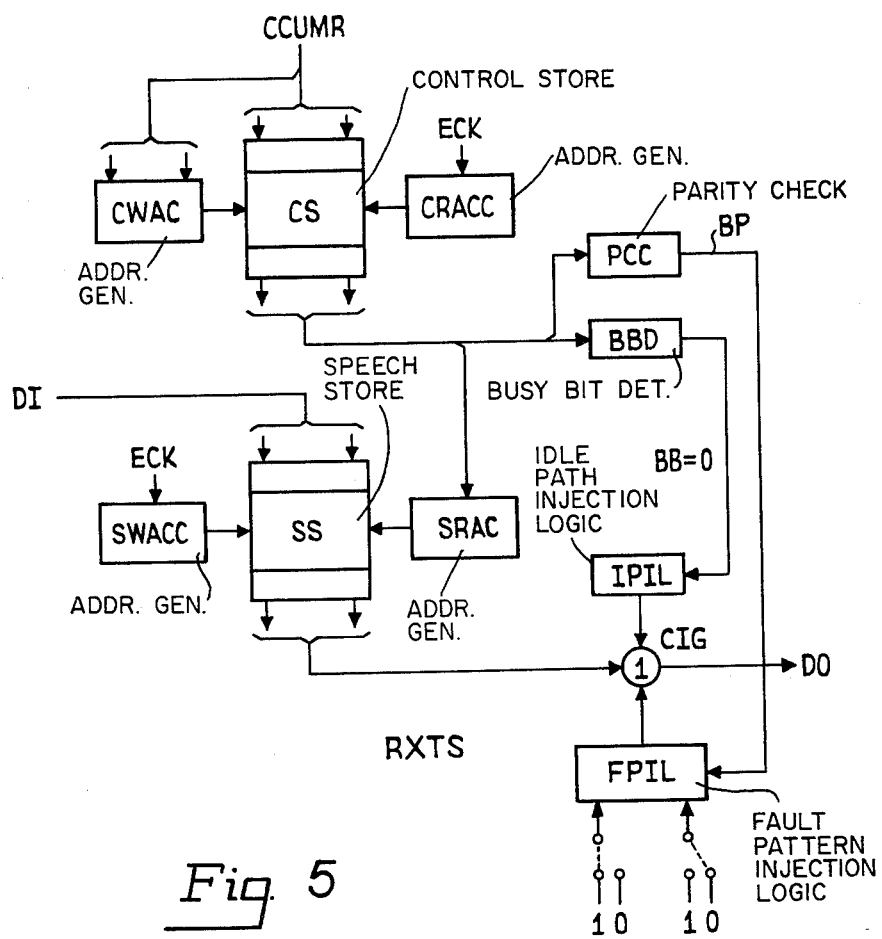
FIG. 5 shows a block diagram of the equipment required to be incorporated into a receive time switch to implement one embodiment of the invention.

The operations of the busy bit and parity bit are shown in FIG. 5 for a receive time switch and it will be realised that similar arrangements can be provided for the space switch control store and the transmit control store. Referring now to FIG. 5 it will be seen that the control store CS has its cyclic read address counter CRACC and its write address counter CWAC which operate in the manner defined in connection with FIG. 3. Further the speech store SS has its cyclic write address counter SWACC and its read address counter SRAC also operating in the manner defined in connection with FIG. 3. In addition the output path from the control store CS is provided with a parity check circuit PCC and a busy bit detector BBD.

The busy bit detector simply consists of a toggle which is set each time a set busy bit is read from the control store. The busy bit detector toggle, however, when reset causes an idle code to be injected into the speech path DO using the idle path injection logic IPIL and the code injection gate CIG by activating lead BB=0.

The parity check circuit PCC is used to check the parity of the output of the control store CS and if it finds that the parity is bad, i.e. the information at the read CS location has been corrupted a signal on lead BP will activate the fault pattern injection logic FPIL. This logic FPIL is arranged to inject a code on to the speech path using gate CIG which has bad parity and has a pattern indicative of the identity of the control store which has been corrupted. Each time switch is provided with its own unique code which may be programmed into the fault pattern injection logic for that time switch. Typically a unique pattern of 1's and 0's is strapped on to the FPIL logic. Similar arrangement can be provided in the space switch and the transmit time switches and the table below summarises the situation.

| Trunking Module | Control Store Parity Status (0 = good parity) | Busy Bit | Pattern $\overline{P}$ (bad parity) |
|---|---|---|---|
| Rx Time Switch | 0 | 0 | Rx IDLE Pattern |
| | 0 | 1 | Speech |
| | 1 | 0 | Rx T.S. Parity Error Pattern |
| | 1 | 1 | Rx T.S. Parity Error Pattern |
| Tx Time Switch | 0 | 0 | Tx IDLE Pattern |
| | 0 | 1 | Speech |
| | 1 | 0 | Tx T.S. Parity Error Pattern |
| | 1 | 1 | Tx T.S. Parity Error Pattern |
| Space Switch | 0 | X | Speech |
| | 1 | X | Space Switch Parity Error Pattern |

NB X = irrelevant

The above information is extractable by the control equipment interrogating the transmit DLT's which detect the bad parity or idle patterns.

The above description has been of one embodiment only and alternative arrangements will be seen by those skilled in the art. For example alternative trunking could be used in the form of say a S-T-S network with the fault pattern injection being made at the component switch points.

What we claim is:

1. A telecommunications exchange switching network including time and space switching stages in which each time and space switching stage includes connection control stores arranged to be cyclically read in cross-office slot order to provide the speech path connection information for each cross-office slot and each control store includes checking means arranged to check the authenticity of the connection specified by the control store at each cross-office slot and each switching stage includes fault pattern injection means arranged to be activated, in the event that said checking means detects an error, to inject a characteristic pattern, which is a corrupted speech sample and is indicative of the identity of the switching store, into the speech path defined by the connection control store in a particular slot.

2. A telecommunications exchange switching network according to claim 1 in which each switching stage is allocated a unique identity and each fault pattern injection means is programmed with the unique identity of the switching stage in which it resides.

3. A telecommunications exchange switching network according to claim 2 in which each control store location includes a parity bit indicative of the parity of the connection address stored at that location, and the checking means is arranged to compute the parity for each connection address read from the control store and to compare the computed parity with the stored parity and if they do not equate, the checking means activates the fault pattern injection means.

* * * * *